United States Patent [19]

Kaba et al.

[11] Patent Number: 4,947,913
[45] Date of Patent: Aug. 14, 1990

[54] PNEUMATIC RADIAL TIRE PROFILE

[75] Inventors: Kazuyuki Kaba, Hiratsuka; Ken Takahashi, Atsugi; Masashi Kida, Chigasaki, all of Japan

[73] Assignee: The Yokohama Rubber Co., Ltd., Tokyo, Japan

[21] Appl. No.: 237,469

[22] Filed: Aug. 29, 1988

[51] Int. Cl.$^5$ ............................................. B60C 3/00
[52] U.S. Cl. ................................... 152/454; 152/523
[58] Field of Search ................. 152/454, 522–525, 152/453, DIG. 12, 209 R; D12/152

[56] References Cited

U.S. PATENT DOCUMENTS

| | | | |
|---|---|---|---|
| 208,617 | 9/1967 | Ueno | D12/152 |
| 1,481,488 | 1/1924 | Tobin | 152/454 X |
| 2,572,259 | 10/1951 | Gottschall | 152/523 |
| 3,835,907 | 9/1974 | Bishton | 152/523 X |
| 4,319,618 | 3/1982 | Suzuki | 152/523 X |

*Primary Examiner*—Michael W. Ball
*Assistant Examiner*—Geoffrey L. Knable
*Attorney, Agent, or Firm*—Armstrong, Nikaido, Marmelstein, Kubovcik & Murray

[57] ABSTRACT

A pneumatic radial tire having such a radial cross-section that the profile of the outer surface of the tire side is composed of a plurality of straight lines and each intersection at which the straight lines meet with each other is formed so as to protrude in the outward direction of the cross-section of the tire.

2 Claims, 3 Drawing Sheets

PNEUMATIC RADIAL TIRE PROFILE

BACKGROUND OF THE INVENTION

The present invention relates to an improvement in the profile of the outer surface of a pneumatic radial tire, particularly a heavy-load pneumatic radial tire.

In the case of a heavy-load pneumatic radial tire, a load applied per tire is high, which brings about various problems with respect to durability. Specifically, in respect of each portion of a tire, there exist various problems such as occurrence of separation at the belt edge of the belt portion, occurrence of peeling of cords in the carcass layer around the side portion from rubber surrounding the cords (cushion rubber and filler rubber), and occurrence of separation of the bead portion around the bead core thereof from the turn-up end of the carcass layer.

For this reason, although, for example, the so-called reinforcing layer (a chafer) has been provided in the prior art on the bead portion for the purpose of suppressing the occurrence of the separation in the bead portion, no satisfactory effect could be attained (see Japanese Patent Application Kokai Publication Nos. 49-902, 49-113303 and 50-63601).

SUMMARY OF THE INVENTION

An object of the present invention is to provide a pneumatic radial tire improved in its durability through limitation of the profiles of the outer surface of a tire side.

In order to attain the above-described object, the present invention provides a pneumatic radial tire comprising a carcass layer and a belt layer provided thereon, wherein in a radial cross-section of said tire, the profile of a portion corresponding to the maximum width of said tire in the outer surface of said tire is composed of a straight line substantially perpendicular to the axis of rotation of said tire while the profiles of the other portions of the outer surface of said tire are each composed of a straight line and each intersection at which said straight lines meet with each other is formed so as to protrude in the outward direction of the cross-section of said tire.

This and other objects will be apparent from the following detailed description.

DETAILED DESCRIPTION OF THE PREFERRED EMBODIMENTS

Figure 4:
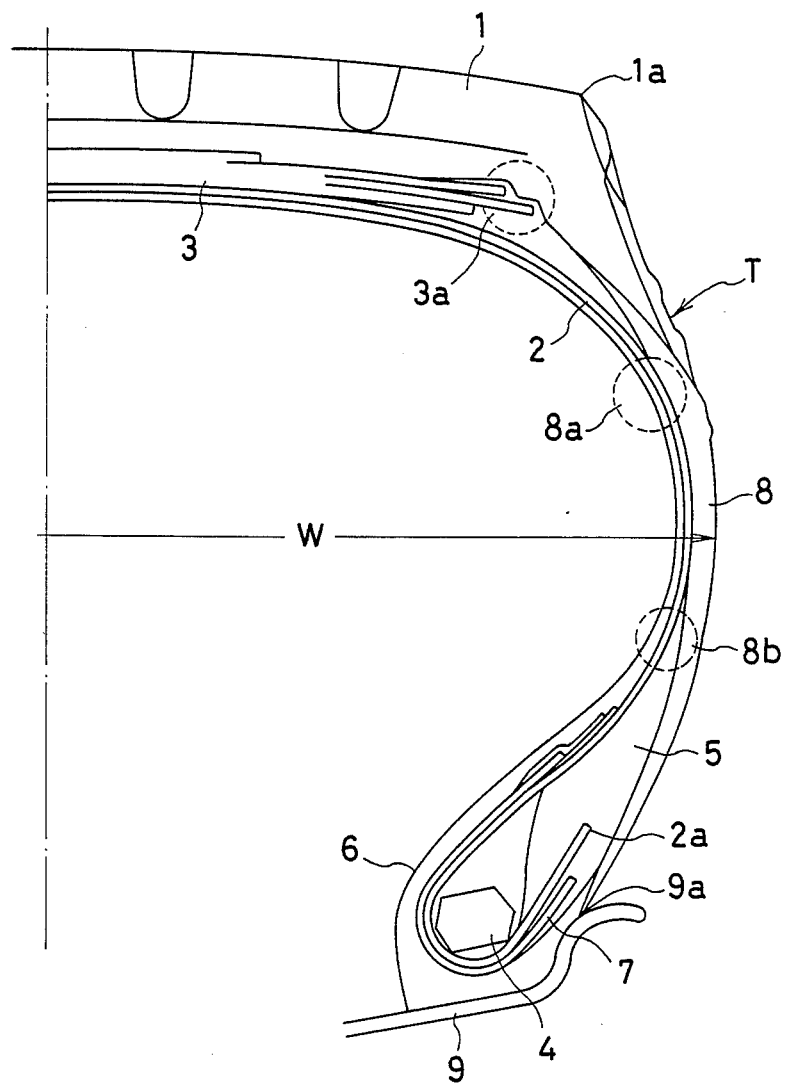
FIG. 4 is an illustrative radial half cross-sectional view of an example of the conventional radial tire.

In FIG. 4, numeral 1 designates a tread, and numeral 2 designates a carcass layer provided between a pair of left and right bead cores 4, 4. In the tread 1, a belt layer 3 is disposed so as to surround the outer periphery of the carcass layer 2. A bead filler 5 is disposed on the bead core 4, and a chafer 7 is provided on the outer side of the turn-up end 2a of the carcass layer in the bead portion 6. The tire is fit into a rim 9. In the drawing, numeral 1a designates an end portion of the tread, numeral 9a designates a boundary portion at which the tire exposes on the rim 9, and letter W designates the maximum width of the tire.

In the conventional radial tire shown in FIG. 4, in a radial (meridian) cross-section thereof, the outer surface T of the tire side located between the end portion 1a of the tread and the boundary portion 9a has a rounded profile such as the one which is formed by continuously connecting several arcs to one another. That is, the outer surface T of the tire side has a continuous profile. On the other hand, in the internal structure of the tire, a belt edge 3a of the belt portion, the turn-up end 2a of the carcass layer, and the boundaries 8a, 8b between the carcass layer 2 and the upper end of the cushion rubber or filler rubber are structurally discontinuous with each other with respect to the rigidity. For each reason, the separation occurs in each of the belt edge 3a, the turn-up end 2a of the carcass layer, and the boundaries 8a, 8b of the side portion, respectively. In particular, since large bending occurs around the boundaries of the side portion during travelling of the tire, the discontinuity of the rigidity becomes a major cause of the occurrence of the separation.

In the present invention, the above-described discontinuity of the rigidity is eliminated by increasing the thickness of the rubber provided at a position corresponding to the discontinuous portion. That is, the thickness of the rubber provided at positions of the side portion 8 which are hardly structurally discontinued with respect to the rigidity, particularly at a position corresponding to the maximum width of the tire is decreased to share the bending of the tire during travelling to this portion, thereby improving the durability of the tire as a whole. Therefore, the characteristic feature of the present invention resides in an improvement in the durability of a tire through an improvement in the profile of the outer surface of the tire side without altering the internal structure of the tire.

Figure 1:
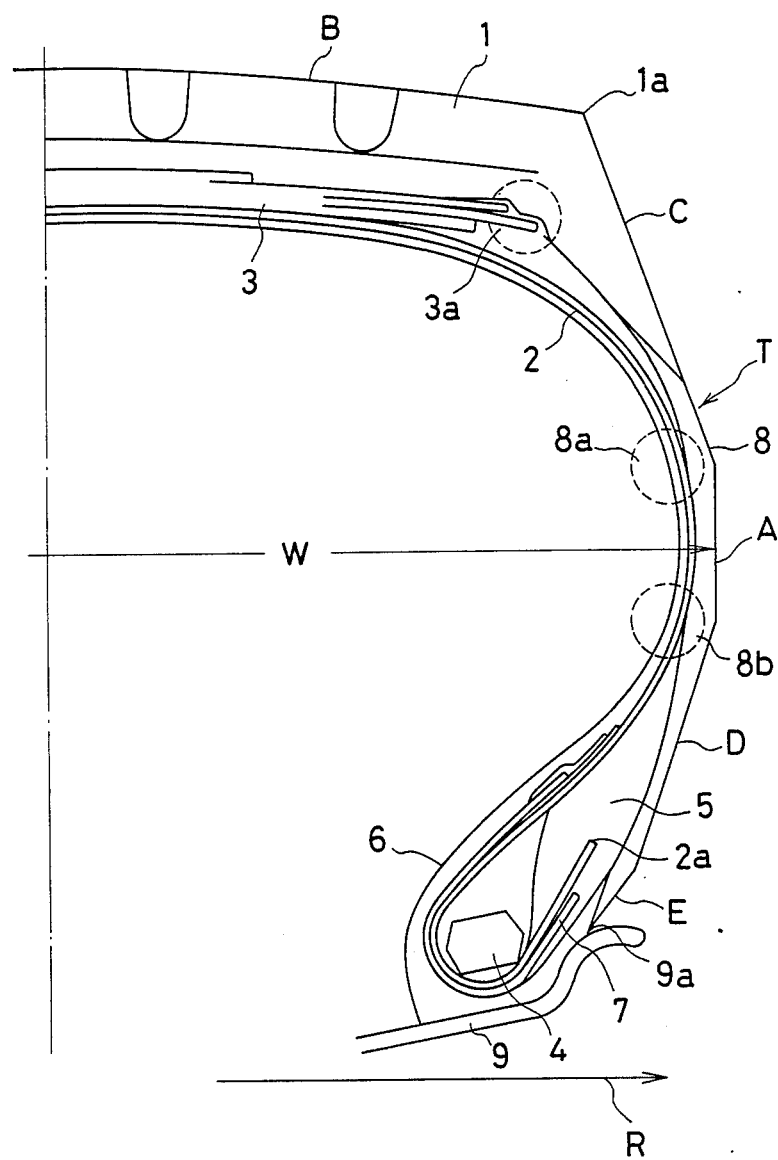
FIG. 1 is an illustrative half cross-sectional view of an example of the radial tire according to the present invention.

FIG. 1 is an illustrative radial half cross-sectional view of an example of the radial tire of the present invention. In FIG. 1, the same portions as those of FIG. 4 are designated by the same numerals and letters as those of FIG. 4. The carcass layer 2 may be disposed in at least one layer. The cord of the carcass layer 2 may be made of steel or organic fibers such as nylon or polyester. The belt layer 3 is disposed in at least one layer, usually three or four laminated layers. Although the cord of the belt layer 3 is usually a steel cord, an aramid cord (aromatic polyamide fiber cord) or the like may also be used.

In the present invention, as shown in FIG. 1, the profile of a surface A of a position corresponding to the maximum width of said tire is composed of a straight line substantially perpendicular to the axis of rotation R of said tire while the profiles of the other portions C to E are each composed of a straight line. The profile of the surface A is composed of a straight line substantially perpendicular to the axis of rotation of the tire in order to concentrate the stress caused by repetition of bending during travelling of the tire on the portion of the surface A through a decrease in the wall thickness of the tire at the central portion of the surface A which is hardly structurally discontinued with respect to the rigidity. It is noted that as with the conventional tire, the profile of the tread surface B is composed of an arc having a large curvature. In the tire of the present invention, the profile of the outer surface T of the tire side is composed of a combination of straight lines for the purpose of decreasing the change in the rigidity of the wall portion of the tire. The discontinuity of this surface profile compensates for the discontinuity of the internal structure (the belt edge 3a of the belt portion, the turn-up end 2a of the carcass layer, and the boundaries 8a, 8b of the side portion) of the tire. Although there is no particular limitation with respect to the number of straight lines, it is preferred that the profile of the outer surface of each of the sides of the tire is composed of at least three straight lines, preferably 3 to 5 straight lines. This is because when the number of straight lines is less than 3, there appears a position where a thickness defined by a distance from the carcass layer 2 to the outer surface T of the tire side is excessively large.

Further, in the present invention, each intersection at which the straight lines in the outer surface T of the tire side meet with each other is formed so as to protrude in the outward direction of the cross-section of the tire, i.e., circularly formed in the circumferential direction of the tire. This (i.e., an increase in the thickness of the tire in this portion) is for enhancing an effect of compensating the discontinuity of the internal structure of the tire with the above-described discontinuity of the surface profile.

Thus, an increase in the thickness of the outer surface at positions corresponding to those which are discontinuous with respect to the internal rigidity of the tire contributes to an enhancement of the effect of compensation of the discontinuity and a decrease in the shearing strain, which brings about an improvement in the durability of the tire. This can be confirmed also through calculation on a simple model shown in FIGS. 2 and 3.

Figure 2:
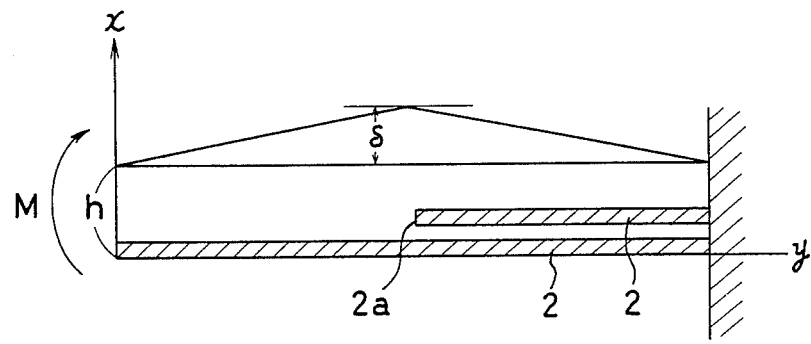
FIG. 2 is a schematic view of the carcass layer around the bead portion, the turn-up end of the carcass layer, and the thickness of the rubber provided on the outer surface of the tire.
Figure 3:
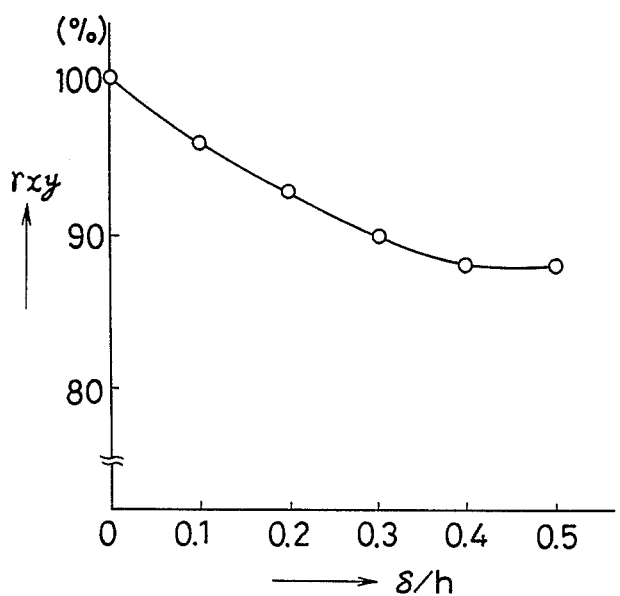
FIG. 3 is a graph showing the relationship between the shearing strain at the turn-up end of the carcass layer and the thickness of the rubber provided on the outer surface of the tire.

FIG. 2 is a schematic view of the carcass layer 2 around the bead portion, the turn-up end 2a of the carcass layer, and the thickness $\delta$ of the rubber provided on the outer surface. In the drawing, letter x designates the thicknesswise direction of the tire, letter y the lengthwise direction of the tire, and letter h the thickness of the tire. The shearing strains $\gamma xy$ at the turn-up end 2a of the carcass layer in the case of the application of a bending moment M to this model were determined in varied thickness of the rubber provided on the outer surface, and the values thus obtained were plotted in FIG. 3. FIG. 3 is a graph showing the relationship between the shearing strain $\gamma xy$ at the turn-up end 2a of the carcass layer and the thickness ratio $\delta/h$ of the rubber provided on the outer surface. It is apparent from FIG. 3 that an increase in the thickness of the rubber provided on the outer surface of the portions which are discontinuous with respect to the internal rigidity enables the shearing strain at the turn-up end 2a of the carcass layer to be decreased, which makes it possible to suppress the occurrence of the separation at the turn-up end 2a of the carcass layer.

As described above, according to the present invention, the specification of the profile of the outer surface of the tire contributes to the prevention of the occurrence of the separation at the positions where there occurs discontinuity with respect to the rigidity within the tire, which enables an improvement in the durability of the tire.

We claim:

1. A pneumatic radial tire comprising a carcass layer and a belt layer provided thereon, wherein in a radial cross-section of said tire, the profile of an outer sidewall surface of said tire from a lateral tread edge to a boundary point where said sidewall is adapted to contact a rim consists of plural straight lines, wherein the straight line in the sidewall portion corresponding to the maximum width of said tire is substantially perpendicular to the axis of rotation of said tire and each intersection at which said straight lines meet with each other is formed so as to protrude in the outward direction of the cross-section of said tire and corresponds to a position which is discontinuous with respect to the internal rigidity of the tire.

2. A pneumatic radial tire according to claim 1, wherein the profile of the outer sidewall surface of each of the sides of the tire consists of 3 to 5 straight lines.

* * * * *